US012559413B2

(12) United States Patent
Tezuka

(10) Patent No.: US 12,559,413 B2
(45) Date of Patent: Feb. 24, 2026

(54) OPTICAL GLASS, PREFORM FOR PRECISION PRESS MOLDING, AND OPTICAL ELEMENT

(71) Applicant: Sumita Optical Glass, Inc., Saitama (JP)

(72) Inventor: Tatsuya Tezuka, Saitama (JP)

(73) Assignee: Sumita Optical Glass, Inc., Saitama (JP)

( * ) Notice: Subject to any disclaimer, the term of this patent is extended or adjusted under 35 U.S.C. 154(b) by 469 days.

(21) Appl. No.: 18/247,645

(22) PCT Filed: Oct. 4, 2021

(86) PCT No.: PCT/JP2021/036694
§ 371 (c)(1),
(2) Date: Apr. 3, 2023

(87) PCT Pub. No.: WO2022/085418
PCT Pub. Date: Apr. 28, 2022

(65) Prior Publication Data
US 2023/0391660 A1 Dec. 7, 2023

(30) Foreign Application Priority Data
Oct. 21, 2020 (JP) .................................. 2020-176950

(51) Int. Cl.
C03C 3/19 (2006.01)
C03C 3/17 (2006.01)
C03C 3/21 (2006.01)

(52) U.S. Cl.
CPC .................. C03C 3/19 (2013.01); C03C 3/17 (2013.01); C03C 3/21 (2013.01)

(58) Field of Classification Search
CPC .... C03C 3/16; C03C 3/17; C03C 3/19; C03C 3/21
See application file for complete search history.

(56) References Cited

U.S. PATENT DOCUMENTS

2010/0298111 A1* 11/2010 Oogaki ..................... C03C 3/19
501/77

FOREIGN PATENT DOCUMENTS

| CN | 101891385 | A | | 11/2010 | |
|----|-----------|---|---|---------|---|
| CN | 103339075 | A | | 10/2013 | |
| JP | S62100451 | A | * | 5/1987 | |
| JP | 2006052119 | A | | 2/2006 | |
| JP | 2010269980 | A | | 12/2010 | |
| JP | 2011241128 | A | | 12/2011 | |
| JP | 5713024 | B2 | * | 5/2015 | ............... C03C 3/21 |
| WO | 2012086539 | A1 | | 6/2012 | |

OTHER PUBLICATIONS

Oct. 16, 2024, Office Action issued by the Taiwan Intellectual Property Office in the corresponding Taiwanese Patent Application No. 110138208.
Oct. 22, 2024, Notification of Reasons for Refusal issued by the Japan Patent Office in the corresponding Japanese Patent Application No. 2020-176950.
Oct. 25, 2024, Office Action issued by the China National Intellectual Property Administration in the corresponding Chinese Patent Application No. 202180062560.8.
Jun. 11, 2025, Office Action issued by the China National Intellectual Property Administration in the corresponding Chinese Patent Application No. 202180062560.8.
Feb. 18, 2025, Office Action issued by the China National Intellectual Property Administration in the corresponding Chinese Patent Application No. 202180062560.8.
Jul. 18, 2024, Office Action issued by the China National Intellectual Property Administration in the corresponding Chinese Patent Application No. 202180062560.8.
Jul. 23, 2024, Notification of Reasons for Refusal issued by the Japan Patent Office in the corresponding Japanese Patent Application No. 2020-176950.
Mar. 7, 2025, Office Action issued by the Taiwan Intellectual Property Office in the corresponding Taiwanese Patent Application No. 110138208.
Nov. 16, 2021, International Search Report issued in the International Patent Application No. PCT/JP2021/036694.
Apr. 13, 2023, International Preliminary Report on Patentability issued in the International Patent Application No. PCT/JP2021/036694.

* cited by examiner

*Primary Examiner* — Elizabeth A. Bolden
(74) *Attorney, Agent, or Firm* — KENJA IP LAW PC

(57) ABSTRACT

Provided is an optical glass having a composition including, by mol %: 0% to 15 % $B_2O_3$; 25% to 40% $P_2O_5$, the total content of $B_2O_3$ and $P_2O_5$ being 35% to 45%; 0% to 10% $Al_2O_3$; 5% to 15% $Li_2O$; 0% to 15% $Na_2O$; 0% to 5% $K_2O$; 0% to 35% MgO; 0% to 35% CaO, the total content of MgO and CaO being 20% or more; 0% to 5 % ZnO; 0% to 3% $ZrO_2$; 0% to 3% $Y_2O_3$; 0% to 3% $La_2O_3$; and 0% to 3% $Gd_2O_3$. The composition does not contain SrO and BaO.

20 Claims, No Drawings

OPTICAL GLASS, PREFORM FOR PRECISION PRESS MOLDING, AND OPTICAL ELEMENT

TECHNICAL FIELD

The present disclosure relates to an optical glass, a preform for precision press molding, and an optical element.

BACKGROUND

Optical elements made using a glass having optical constants of a refractive index (nd) of around 1.50 to 1.60 and an Abbe number (vd) of around 60 to 70 (so-called low dispersion glass) are useful in correcting chromatic aberration, and are used in various optical devices. Further, in recent years, as demands for optical devices designed for outdoor uses such as ones in vehicle mounted cameras and cameras for drone aerial shooting increase, there is a demand for optical elements having characteristics suitable for such use environments. Such characteristics include small changes in the optical characteristics depending on the temperature. Further, in terms of improving the energy efficiency of automobiles, drones, and the like, the glass is also required to be lightweight.

Now, as a low dispersion glass meeting the above optical constants, for example, JP 2006-052119 A (PTL 1) and JP 2011-241128 A (PTL 2) disclose an optical glass that contains $P_2O_5$ and $Li_2O$, and at least one of SrO and BaO.

CITATION LIST

Patent Literature

PTL 1: JP 2006-052119 A
PTL 2: JP 2011-241128 A

SUMMARY

Technical Problem

However, studies made by the present inventor discovered that reduction of changes in the optical characteristics depending on the temperature and sufficient reduction in weight cannot be achieved for the optical glasses disclosed in PTLs 1 and 2 and that there is room for improvement at least with respect to this point.

In addition, it is also important that a low dispersion glass satisfying the above optical constant has excellent formability at low temperatures in terms of mass production and cost reduction as well as excellent chemical durability in terms of reliability.

A glass of the present disclosure has been developed in view of the current circumstances described above, and it could therefore be helpful to provide a low dispersion optical glass that is lightweight, has small changes in optical characteristics depending on the temperature, and is excellent in chemical durability and low temperature formability. Further, it could also be helpful to provide a preform for precision press molding and an optical element each using the above optical glass.

Solution to Problem

The present inventor made diligent studies to achieve the above objectives and found that when the total content of $B_2O_3$ and $P_2O_5$ in a phosphate glass in a composition that does not contain SrO and BaO, in particular, is set within a predetermined range; the total content of MgO and CaO therein is set to a predetermined value or more; and a predetermined ratio of $Li_2O$ is contained therein, the desired optical glass can be produced with a high productivity.

Specifically, an optical glass of the present disclosure has a composition containing, by mol %:
0% or more and 15% or less $B_2O_3$;
25% or more and 40% or less $P_2O_5$, the total content of $B_2O_3$ and $P_2O_5$ being 35% or more and 45% or less;
0% or more and 10% or less $Al_2O_3$;
5% or more and 15% or less $Li_2O$;
0% or more and 15% or less $Na_2O$;
0% or more and 5% or less $K_2O$;
0% or more and 35% or less MgO;
0% or more and 35% or less CaO, the total content of MgO and CaO being 20% or more;
0% or more and 5% or less ZnO;
0% or more and 3% or less $ZrO_2$;
0% or more and 3% or less $Y_2O_3$;
0% or more and 3% or less $La_2O_3$; and
0% or more and 3% or less $Gd_2O_3$,
wherein the composition does not contain SrO and BaO.

The optical glass of the present disclosure is a low dispersion optical glass that is lightweight, has small changes in optical characteristics depending on the temperature, and is excellent in chemical durability and low temperature formability.

The optical glass of the present disclosure preferably has a refractive index (nd) of 1.50 or more and 1.60 or less and an Abbe number (vd) of 60 or more and 70 or less.

The optical glass of the present disclosure preferably has a specific gravity of 2.90 or less.

For the optical glass of the present disclosure, the absolute value of a temperature coefficient of a relative refractive index of the optical glass for a wavelength of 587.6 nm with respect to 0° C. and 20° C. is preferably $2.0 \times 10^{-6}$° $C.^{-1}$ or less.

For the optical glass of the present disclosure, the class of DW of chemical durability measured by a surface method based on JOGIS 07-2019 is preferably either Class 1 or 2.

The optical glass of the present disclosure preferably has a glass-transition temperature Tg of 500° C. or less and a yield temperature At of 540° C. or less.

A preform for precision press molding, according to the present disclosure uses, as a material, the optical glass described above.

An optical element of the present disclosure uses, as a material, the optical glass described above.

Advantageous Effect

The present disclosure can provide a low dispersion optical glass that is lightweight, has small changes in optical characteristics depending on the temperature, and is excellent in chemical durability and low temperature formability. Further, the present disclosure can also provide a preform for precision press molding and an optical element each using the above optical glass.

DETAILED DESCRIPTION

Embodiments of the present disclosure will now be described in detail.

3

(Optical Glass)

An optical glass of one embodiment of the present disclosure (hereinafter, may also be referred to as "the glass of this embodiment" has a composition including, by mol %:

0% or more and 15% or less $B_2O_3$;
25% or more and 40% or less $P_2O_5$, the total content of $B_2O_3$ and $P_2O_5$ being 35% or 45% or less;
0% or more and 10% or less $Al_2O_3$;
5% or more and 15% or less $Li_2O$;
0% or more and 15% or less $Na_2O$;
0% or more and 5% or less $K_2O$;
0% or more and 35% or less MgO;
0% or more and 35% or less CaO, the total content of MgO and CaO being 20% or more;
0% or more and 5% or less ZnO;
0% or more and 3% or less $ZrO_2$;
0% or more and 3% or less $Y_2O_3$;
0% or more and 3% or less $La_2O_3$; and
0% or more and 3% or less $Gd_2O_3$.

The composition does not contain SrO and BaO.

The optical glass of this embodiment may contain components (described later) other than the components mentioned above. Note however that the optical glass of this embodiment preferably has a composition consisting only of the above components ($P_2O_5$ and $Li_2O$ that are essential components and components selected from $B_2O_3$, $Al_2O_3$, $Na_2O$, $K_2O$, MgO, CaO, ZnO, $ZrO_2$, $Y_2O_3$, $La_2O_3$, and $Gd_2O_3$) in terms of reducing changes in the optical characteristics depending on the temperature (hereinafter, also referred to as improving optical stability) and further ensuring low weight, chemical durability, low temperature formability, and low dispersibility.

Now, "consisting only of the above components" include cases where impurity components other than the components concerned are inevitably contained, specifically cases where the ratio of the impurity components is 0.2 mass % or less.

First, the reason for limiting the composition of the optical glass to the above ranges in this embodiment will be described. Note that the symbol "%" in association with the components means mol % unless otherwise specified.

<$B_2O_3$>

In the optical glass of this embodiment, $B_2O_3$ is a component forming a network structure of glass and is a component that provides stability for producing glass and effectively improves the fusibility of glass. However, when the content of $B_2O_3$ exceeds 15%, the devitrification resistance stability is reduced and the key quality of the optical glass would be deteriorated. Accordingly, the content of $B_2O_3$ in the optical glass of this embodiment is set to 0% or more and 15% or less. In similar terms, the content of $B_2O_3$ in the optical glass of this embodiment is preferably 14% or less, more preferably 13% or less.

<$P_2O_5$>

In the optical glass of this embodiment, $P_2O_5$ is an essential component that forms a network structure of glass and provides stability for producing glass. However, when the content of $P_2O_5$ exceeds 40%, the chemical durability is significantly deteriorated. On the other hand, when the content is less than 25%, the devitrification resistance stability and the low temperature formability would be reduced. Accordingly, the content of $P_2O_5$ in the optical glass of this embodiment is set to 25% or more and 40% or less. In similar terms, the content of $P_2O_5$ in the optical glass of this embodiment is preferably 26% or more, more preferably 27% or more and is preferably 39% or less, more preferably 38% or less.

4

<Total Content of $B_2O_3$ and $P_2O_5$>

Now, the total content of $B_2O_3$ and $P_2O_5$ in the optical glass of this embodiment is necessarily 35% or more and 45% or less. When the total content of $B_2O_3$ and $P_2O_5$ exceeds 45%, the chemical durability is significantly reduced; on the other hand, when the content is less than 35%, the devitrification resistance stability and the low temperature formability would be reduced. Also in similar terms, the total content of $B_2O_3$ and $P_2O_5$ in the optical glass of this embodiment is preferably 36% or more, more preferably 37% or more and is preferably 44% or less, more preferably 43% or less.

<$Al_2O_3$>

In the optical glass of this embodiment, $Al_2O_3$ is an effective component for improving the chemical durability. However, when the content of $Al_2O_3$ exceeds 10%, the devitrification resistance stability and the optical stability would be reduced. Accordingly, the content of $Al_2O_3$ in the optical glass of this embodiment is set to 0% or more and 10% or less. In similar terms, the content of $Al_2O_3$ in the optical glass of this embodiment is preferably 9% or less, more preferably 8% or less.

<$Li_2O$>

In the optical glass of this embodiment, $Li_2O$ is an essential component that is effective in improving the fusibility and the low temperature formability and contributes to improving the optical stability (particularly provides a tendency for the refractive index to decrease with the temperature rise). However, when the content of $Li_2O$ exceeds 15%, the devitrification resistance stability is reduced and the key quality of the optical glass would be deteriorated. Further, when the content is less than 5%, the effect of improving the fusibility and the low temperature formability would not sufficiently be obtained. Accordingly, the content of $Li_2O$ in the optical glass of this embodiment is set to 5% or more and 15% or less. In similar terms, the content of $Li_2O$ in the optical glass of this embodiment is preferably 6% or more, more preferably 7% or more and is preferably 14% or less, more preferably 13% or less.

<$Na_2O$>

In the optical glass of this embodiment, $Na_2O$ is a component that is effective in improving the fusibility and the low temperature formability and contributes to improving the optical stability (particularly provides a tendency for the refractive index to decrease with the temperature rise). However, when the content of $Na_2O$ exceeds 15%, the refractive index would excessively decrease with the temperature rise. Accordingly, the content of $Na_2O$ in the optical glass of this embodiment is set to 0% or more and 15% or less. In similar terms, the content of $Na_2O$ in the optical glass of this embodiment is preferably 14% or less, more preferably 13% or less.

<$K_2O$>

In the optical glass of this embodiment, $K_2O$ is a component that is effective in improving the fusibility and the low temperature formability and contributes to improving the optical stability (particularly provides a tendency for the refractive index to decrease with the temperature rise). However, when the content of $K_2O$ exceeds 5%, the devitrification resistance stability is reduced and the key quality of the optical glass would be deteriorated. Accordingly, the content of $K_2O$ in the optical glass of this embodiment is set to 0% or more and 5% or less. In similar terms, the content of $K_2O$ in the optical glass of this embodiment is preferably 4% or less, more preferably 3% or less.

<MgO>

In the optical glass of this embodiment, MgO is a component that improves the chemical durability and the low dispersibility and is effective in reducing the weight. However, when the content of MgO exceeds 35%, the fusibility is reduced and the devitrification resistance stability is reduced, thus the key quality of the optical glass would be deteriorated. Accordingly, the content of MgO in the optical glass of this embodiment is set to 0% or more and 35% or less. In similar terms, the content of MgO in the optical glass of this embodiment is preferably 34% or less, more preferably 33% or less.

<CaO>

In the optical glass of this embodiment, CaO is a component that is effective in improving the chemical durability and the devitrification resistance stability. However, when the content of CaO exceeds 35%, the devitrification resistance stability and the low temperature formability would be reduced. Accordingly, the content of CaO in the optical glass of this embodiment is set to 0% or more and 35% or less. In similar terms, the content of CaO in the optical glass of this embodiment is preferably 34% or less, more preferably 33% or less.

<Total Content of MgO and CaO>

Now, the total content of MgO and CaO in the optical glass of this embodiment is necessarily 20% or more. When the total content of MgO and CaO is less than 20%, the chemical durability would be reduced. Also in similar terms, the total content of MgO and CaO in the optical glass of this embodiment is preferably 22% or more, more preferably 24% or more, and still more preferably 26% or more. On the other hand, in terms of better maintaining the devitrification resistance stability and the low temperature formability, the total content of MgO and CaO in the optical glass of this embodiment is preferably 60% or less, more preferably 55% or less, still more preferably 53% or less, and yet more preferably 51% or less.

<ZnO>

In the optical glass of this embodiment, ZnO is a component that is effective in improving the chemical durability. However, when the content of ZnO exceeds 5%, the devitrification resistance stability and the low dispersibility would be reduced. Accordingly, the content of ZnO in the optical glass of this embodiment is set to 0% or more and 5% or less. In similar terms, the content of ZnO in the optical glass of this embodiment is preferably 4% or less, more preferably 3% or less.

<$ZrO_2$>

In the optical glass of this embodiment, $ZrO_2$ is a component that is effective in improving the chemical durability. However, when the content of $ZrO_2$ exceeds 3%, the devitrification resistance stability and the low temperature formability would be reduced. Accordingly, the content of $ZrO_2$ in the optical glass of this embodiment is set to 0% or more and 3% or less. In similar terms, the content of $ZrO_2$ in the optical glass of this embodiment is preferably 2% or less, more preferably 1% or less.

<$Y_2O_3$>

In the optical glass of this embodiment, $Y_2O_3$ is a component that is effective in improving the chemical durability. However, when the content of $Y_2O_3$ exceeds 3%, the devitrification resistance stability and the lightness would suffer. Accordingly, the content of $Y_2O_3$ in the optical glass of this embodiment is set to 0% or more and 3% or less. In similar terms, the content of $Y_2O_3$ in the optical glass of this embodiment is preferably 2% or less, more preferably 1% or less.

<$La_2O_3$>

$La_2O_3$ is a component that is effective in improving the chemical durability of the optical glass of this embodiment. However, when the content of $La_2O_3$ exceeds 3%, the devitrification resistance stability and low weight would suffer. Accordingly, the content of $La_2O_3$ in the optical glass of this embodiment is set to 0% or more and 3% or less. In similar terms, the content of $La_2O_3$ in the optical glass of this embodiment is preferably 2% or less, more preferably 1% or less.

<$Gd_2O_3$>

$Gd_2O_3$ is a component that is effective in improving the chemical durability of the optical glass of this embodiment. However, when the content of $Gd_2O_3$ exceeds 3%, the devitrification resistance stability and the lightness would suffer. Accordingly, the content of $Gd_2O_3$ in the optical glass of this embodiment is set to 0% or more and 3% or less. In similar terms, the content of $Gd_2O_3$ in the optical glass of this embodiment is preferably 2% or less, more preferably 1% or less.

<SrO and BaO>

Either SrO or BaO was found to provide a tendency for the refractive index to decrease with the temperature rise, and to possibly impair the lightness (increase the specific gravity) of the optical glass of this embodiment that contains the components describe above. This being the case, the optical glass of this embodiment was made not to contain SrO and BaO.

As used herein, "not contain SrO and BaO" means that SrO and BaO are not deliberately contained, namely, SrO and BaO are substantially not contained.

<Other Components>

The optical glass of this embodiment may contain components other than the components mentioned above as long as it meets the purpose. The other components may include, for example, $SiO_2$, $GeO_2$, $Nb_2O_5$, $Ta_2O_5$, $WO_3$, and $Bi_2O_3$. Note however that in terms of more reliably obtaining the desired effects, the ratio of the other components mentioned above in the optical glass of this embodiment is preferably 10 mol % or less, more preferably 5 mol % or less, still more preferably 3 mol % or less, yet more preferably 1 mol % or less, and particularly preferably, substantially 0 mol % (the optical glass has a composition consisting only of the components described above).

The characteristics of an optical glass of this embodiment will now be described.

<Refractive Index (Nd) and Abbe Number (vd)>

The optical glass of this embodiment preferably has a refractive index (nd) of 1.50 or more and 1.60 or less and an Abbe number (vd) of 60 or more 70 or less in terms of obtaining desired low dispersibility. Further, the refractive index (nd) of the optical glass of this embodiment is preferably 1.51 or more, more preferably 1.52 or more. Moreover, the Abbe number (vd) of the optical glass of this embodiment is preferably 61 or more, more preferably 62 or more.

<Specific Gravity (S·g)>

The specific gravity (S·g) of the glass of this embodiment is preferably 2.90 or less in terms of achieving desired lightness. Further, the specific gravity of the optical glass of this embodiment is preferably 2.85 or less, more preferably 2.80 or less.

<Temperature Coefficient of Relative Refractive Index (0° C. and 20° C., Wavelength: 587.6 nm)>

For the optical glass of this embodiment, in terms of obtaining the desired optical stability, the absolute value of the temperature coefficient of the relative refractive index (0° C. and 20° C., wavelength: 587.6 nm) is preferably $2.0 \times 10^{-6\circ}$ C.-1 or less. Further, the absolute value for the optical glass of this embodiment is more preferably $1.8 \times 10^{-6\circ}$ C.$^{-1}$ or less, still more preferably $1.6 \times 10^{-6\circ}$ C.$^{-1}$ or less.

<Chemical Durability>

For the optical glass of this embodiment, in terms of obtaining the desired chemical durability, the class (DW) of chemical durability (surface method) based on JOGIS 07-2019 is preferably Class 1 or 2.

<Glass Transition Temperature (Tg) and Yield Temperature (At)>

For the optical glass of this embodiment, in terms of obtaining the desired low-temperature formability, the glass transition temperature (Tg) is preferably 500° C. or less and the yield temperature (At) is preferably 540° C. or less. Moreover, the glass transition temperature (Tg) of the optical glass of this embodiment is preferably 490° C. or less, more preferably 480° C. or less. Further, the yield temperature (At) of the optical glass of this embodiment is preferably 530° C. or less, more preferably 520° C. or less.

Note that the characteristics described above can be measured by the procedure described in Examples. Further, the characteristics of the optical glass of this embodiment can be adjusted for example by appropriately controlling the content of each component described above in a predetermined range.

<Method of Producing Optical Glass>

A method of producing an optical glass of this embodiment will now be described.

The method of producing the optical glass of this embodiment is not limited as long as the composition of the components satisfy the ranges described above, and the optical glass can be according to an existing production method.

For example, first, as materials of the components contained in the optical glass of this embodiment, oxides, hydroxides, carbonates, nitrate, phosphates, and the like are measured to achieve predetermined weight ratios and sufficiently mixed, thereby obtaining a glass batch. Next, this batch is charged into a melting container (for example, a crucible made of precious metal) that is not reactive with glass materials, and the batch is heated and melted at 1000° C. to 1300° C. in an electric furnace and stirred in a timely manner. Subsequently, the molten product is subjected to clarification and homogenization, and is then cast into a mold that is preheated to an appropriate temperature, and is allowed to cool slowly in the electric furnace to thereby remove strain, thus the optical glass of this embodiment can be produced. Here, for inhibiting coloring of glass and for defoaming of the glass, a trace amount (for example, an amount corresponding to 0.5 mass % or less in the optical glass) of an industrially-known component such as $Sb_2O_3$ may be added.

Now, the optical glass of this embodiment can be used as a material of a preform for precision press molding and an optical glass as descried below.

(Preform for Precision Press Molding)

A preform for precision press molding, according to one embodiment of the present disclosure (hereinafter may also be referred to as "preform of this embodiment") will now be described in detail.

A preform for precision press molding (precision press-molding preform) here is a preformed glass material to be used for a known precision press molding method, that is, a glass preform to be heated and subjected to precision press molding.

Precision press molding here is also called mold optics molding as is known, and is a method in which an optical surface of an optical element to be finally obtained is formed by transferring the shape of a mold surface of a press molding mold. Note that an optical surface means a surface of an optical element, at which light to be controlled is refracted, refracted, diffracted, input/output, or the like; for example, a lens surface of a lens corresponds to such an optical surface.

For the preform of this embodiment, the optical glass described above is used as a material. Accordingly, using the optical glass described above as a material, the preform of this embodiment is lightweight, has small changes in the optical characteristics depending on the temperature, and is excellent in chemical durability and low temperature formability.

In terms of obtaining desired performances, the preform of this embodiment preferably satisfies the essential requirements on the composition of the components described above regarding the optical glass of the present disclosure, and more preferably satisfies the preferred requirements described above regarding the optical glass of the present disclosure.

A method of forming a preform of this embodiment is not limited. Note however that the preform of this embodiment is desirably produced by the following production method using excellent characteristics of the above optical glass.

A first method of producing a preform (referred to as "a preform production method I") is a method of melting an optical glass as a material and flowing out and separating the molten glass obtained as a molten glass mass, and forming the molten glass mass into a preform in cooling the molten glass mass.

A second method of producing a preform (referred to as "a preform production method II") is a method of melting an optical glass as a material and forming the molten glass obtained into a glass molded product, and processing the molded product to obtain a preform.

The preform production methods I and II have in common the step of obtaining homogeneous molten glass from the optical glass as a material. In this step, for example, optical glass materials prepared to achieve the desired characteristics are charged into a platinum melting container; are subjected to heating, melting, clarification, and homogenization to prepare homogeneous molten glass; and can be flown out through an outflow nozzle or an outflow pipe that is made of platinum or a platinum alloy at a controlled temperature. Alternatively, the optical glass materials may be roughly melted to produce cullet; the cullet may be compounded and subjected to heating, melting, clarification, and homogenization to obtain homogeneous molten glass; and the homogeneous molten glass may be flown out through the above outflow nozzle or outflow pipe.

Now, when a small-sized preform or a spherical preform is produced, for example, a method may be employed in which the molten glass is dropped as molten glass drops having a desired mass, from the outflow nozzle, and is received by a metal mold or the like to be formed into a preform. Alternatively, a method of similarly dropping molten glass drops having a desired mass from the outflow nozzle into liquid nitrogen or the like to form a preform may be employed.

On the other hand, when a mid- to large-sized preform is produced, for example, a method may be employed in which a molten glass stream is flown down through an outflow pipe; a leading part of the molten glass stream is received by a preform mold or the like to form a narrow part in the molten glass stream between the nozzle and the preform mold; the preform mold is rapidly lowered vertically downward to separate the molten glass stream at the narrow part using the surface tension of the molten glass; and a molten glass mass having a desired mass is received by a receiving member to be formed into a preform.

Both of these methods fall under dropping methods. Since the melt of the optical glass of this embodiment that is used as a material has low viscosity, these dropping methods can suitably be conducted.

It should be noted that methods used to obtain a preform having a smooth surface without flaws, soils, wrinkles, and deterioration of the surface, for example, a free surface include, a method in which a wind pressure is applied to a molten glass mass such that the molten glass mass is formed into a preform while being levitated, or a method in which molten glass drops are introduced into a medium obtained by liquidizing a substance that is gaseous at room temperature under atmospheric pressure, such as liquid nitrogen by cooling, thereby forming the molten glass drops into a preform.

When the molten glass mass is formed into a preform while being levitated, a gas (referred to as a levitation gas) is blown against the molten glass mass such that an upward wind pressure is applied to the molten glass mass. In this case, when the viscosity of the molten glass mass is excessively low, the levitation gas penetrates into the glass and would remain as bubbles in the preform. However, when the viscosity of the molten glass mass is set to 3 dPa·s to 60 dPa·s, the glass mass can be levitated without the penetration of the levitation gas into the glass.

Examples of the gas used to blow the levitation gas against the preform includes the air, $N_2$ gas, $O_2$ gas, Ar gas, He gas, and water vapor. Further, the wind pressure is not limited as long as the preform can be levitated without coming in contact with a solid such as the surface of the mold surface.

Since most precision press-molded products (for example, an optical element) produced from a preform have an axis of rotational symmetry as a lens does, the shape of the preform desirably has an axis of rotational symmetry. A specific example of the shape is a sphere or one having one axis of rotational symmetry. Example of the shape having one axis of rotational symmetry includes shapes having a smooth contour line without protrusions or recesses on a cross section including the axis of rotational symmetry, for example, a shape having an elliptical contour line having a minor axis that coincides with the axis of rotational symmetry on the above cross section; and a shape obtained by flattening a sphere (a shape obtained by defining an axis passing through the center of the sphere, and reducing the dimension of the axis in the direction of the axis).

In the preform production method I, the preform is formed at temperatures at which the optical glass is capable of plastic deformation, so that the preform may be obtained by press molding of the glass mass. In this case, since the shape of the preform may be relatively freely set, the shape may be made to approximate to the shape of the precision press-molded product to be obtained. For example, one of opposite surfaces of the shape may be convex while the other is concave; both of them may be concave; one of the surfaces may be flat while the other is convex; one of the surfaces may be flat while the other is concave; or both surfaces may be convex.

In the preform production method II, for example, the molten glass is formed by being cast into a mold, strain in the molded product is then removed by annealing, followed by cutting or cleaving the molded product to obtain separate pieces having a predetermined size and a predetermined shape, thus producing a plurality of glass pieces; while the glass pieces are polished to have a smooth surface, preforms made of a glass having a predetermined mass can be obtained. The thus produced preform is preferably used with the surface being coated with a carbon-containing film. The preform production method II is suitable for the production of a spherical preform or a flat plate-like preform that can be easily ground and polished.

In either production method, high quality preforms can be stably produced, and the mass productivity achieved by the whole optical element production process can be increased.

Next, more preferred preforms are described in terms of enhancing the mass productivity of the molded product such as an optical element obtained by precision press molding.

The optical glass of this embodiment provides excellent press formability in terms of glass materials; when the amount of deformation of the glass in precision press molding is reduced, the temperature of the glass and the mold during precision press molding can be reduced, and the time required for press molding can be reduced, and the press pressure can be reduced, for example. As a result, the reactivity between the glass and the molding surface of the mold is reduced, and the above defects formed during precision press molding are reduced, thus the mass productivity is further increased.

Now, a preform preferred in the case of producing a lens by subjecting a preform to precision press molding is a preform having opposite surfaces to be pressed (surfaces facing one another and pressed by the molding surface of the mold during precision press molding), and a preform further having an axis of rotational symmetry through the centers of the two surfaces to be pressed is more preferred. Of such preforms, a preform suitable for precision press molding of a meniscus lens is one in which one of the surfaces to be pressed is convex while the other surface is concave or flat, or convex if the curvature is smaller than that of the above convex surface.

Meanwhile, a preform suitable for precision press molding of a biconcave lens is a preform in which one of the surfaces to be pressed is convex, concave, or flat, and the other surface is convex, concave, or flat.

On the other hand, a preform suitable for precision press molding of a biconvex lens is a preform in which one of the surfaces to be pressed is convex, and the other surface is convex or flat.

In any one of the cases, the preform is preferably a preform having a shape more approximate to the shape of the precision press-molded product.

When a molten glass mass is formed into a preform using a preform mold, the lower surface of the glass on the mold substantially depends on the shape of the molding surface of the mold. On the other hand, the upper surface of the glass has a shape depending on the surface tension of the molten glass and the own weight of the glass. Now, in order to reduce the amount of deformation of glass during precision press molding, the shape of the upper surface of the glass being formed in the preform mold is also necessarily controlled. The shape of the upper surface of glass that depends on the surface tension of the molten glass and the own weight of the glass forms a convex free surface; in order to make the upper surface be flat or concave, or a convex surface having a small curvature than the free surface, a pressure can be applied to the upper surface of the glass. Specifically, the upper surface of the glass may be pressed using a mold having a molding surface with a desired shape, or a wind pressure may be applied to the upper surface of the glass thereby forming the upper surface into a desired shape. When the upper surface of the glass is pressed using a mold, the molding surface of the mold may be provided with a plurality of gas gets, and a gas may be blown out from these gas gets to form a gas cushion between the molding surface and the glass, thereby pressing the upper surface of the glass with the gas cushion therebetween. Alternatively, to form the upper surface of the glass into a surface having a larger curvature than the above free surface, the upper surface of the glass may be formed to raise the top surface by producing a negative pressure near the upper surface.

Further, to obtain a shape more approximate to the shape of the precision press-molded product, the preform is preferably a preform of which surface has been polished. For example, a preform is preferred in which one of the surfaces to be pressed is polished to form a flat surface or a part of a spherical surface, and the other surface is polished to form a part of a spherical surface or a flat surface. The part of a spherical surface may either be convex or concave; however, whether the part is made to be convex or concave is desirably determined depending on the shape of the precision press-molded product as described above.

Each of the above preform can preferably be used to form a lens having a diameter of 10 mm or more, and can more preferably be used to form a lens having a diameter of 20 mm or more. Further, the preforms can also be preferably used to form a lens having a center thickness of more than 2 mm.

(Optical Element)

An optical element according to one embodiment of the present disclosure (hereinafter may also be referred to as "optical element of this embodiment") will now be described in detail.

For the optical element of this embodiment, the optical glass described above is used as a material. Accordingly, using the optical glass described above as a material, the optical element of this embodiment is lightweight, has small changes in the optical characteristics depending on the temperature, and is excellent in chemical durability.

In terms of obtaining desired performances, the preform of this embodiment preferably satisfies the essential requirements on the composition of the components described above regarding the optical glass of this embodiment, and more preferably satisfies the preferred requirements described above regarding the optical glass of this embodiment.

The type of the optical element may typically be for example, but not limited to, lenses such as aspheric lenses or spherical lenses, or plano-concave lenses, plano-convex lenses, biconcave lenses, biconvex lenses, convex meniscus lenses, or concave meniscus lenses; micro lenses; lens arrays; diffraction grating lenses; prisms; or prism lenses. Preferred examples of the optical element include lenses such as convex meniscus lenses, concave meniscus lenses, biconvex lenses, biconcave lenses, plano-convex lenses, and plano-concave lenses; prisms; and diffraction gratings. The lenses mentioned above may be aspherical lenses or spherical lenses. An antireflection film, a wavelength-selective partially reflecting film, or the like, may be provided on a surface as required.

<Method of Producing Optical Element>

A method of producing an optical element of this embodiment will now be described.

The optical element of this embodiment can be produced for example by precision press molding the above preform using a press mold.

The precision press molding may use a press mold obtained by previously working its molding surface with high accuracy into a desired shape; and a release film may be formed on the molding surface to prevent the glass from being welded during pressing and to make the glass to favorably expand along the molding surface. Examples of the release film include films of noble metal (platinum, platinum alloy), films of oxide (oxide of Si, Al, Zr, Y, etc.), films of nitride (nitride of B, Si, Al, etc.), and carbon-containing films. The carbon-containing films are desirably carbon-based films (when the contents of the elements in the films are expressed in atomic percentage, the carbon content is higher than the contents of the other elements); specifically, examples include carbon films and hydrocarbon films. As a method of forming a carbon-containing film, a known method such as vacuum deposition, sputtering, or ion plating using a carbon material; or a known method such as thermal decomposition using a source gas such as hydrocarbon. The other films can be formed by vapor deposition, sputtering, ion plating, the sol-gel process, or the like.

Further, heating of the press mold and the preform, and the precision press molding step are preferably performed in an atmosphere of a non-oxidizing gas such as nitrogen gas or a mixed gas of nitrogen gas and hydrogen gas in order to prevent the molding surface of the press mold or the release film preferably provided on the molding surface from being oxidized. In the non-oxidizing gas atmosphere, the release film with which the surface of the preform is coated, a carbon-containing film, in particular, is not oxidized, and the film would remain on the surface of the molded product obtained by precision press molding. This film should finally be removed; to relatively easily and completely removing the release film such as a carbon-containing film, the precision press-molded product may be heated in an oxidizing atmosphere, for example in the atmosphere. The removal of the release film such as a carbon-containing film should be performed at temperatures at which the precision press-molded product would not be deformed by heating. Specifically, the release film such as a carbon-containing film is preferably removed at temperatures lower than the transition temperature of the glass.

Note that the method of producing an optical element of this embodiment is not limited, and examples include the following two production methods. In the production of optical elements of this embodiment, the step pf precision press molding the above preform for precision press molding is preferably repeated using the same press mold in terms of mass production of the optical elements.

A first method of producing an optical element (referred to as "optical element production method I") is a method of obtaining an optical element by introducing a preform into a press mold and heating the preform and the press mold together, thus performing precision press molding.

A second optical element production method (referred to as "optical element production method II") is a method of obtaining an optical element by introducing a heated preform into a preheated press mold, thus performing precision press molding.

In the optical element production method I, after a preform is supplied to between a pair of upper and lower molds that face each other and each have a molding surface having been precisely worked, the mold and the preform are heated to a temperature at which the viscosity of the glass is $10^4$ dPa·s to $10^1$ dPa·s thereby softening the preform, and the preform is subjected to pressure forming, thus the shape of the molding surface of the mold can be precisely transferred to the glass. The optical element production method I is a method recommended when improvement of molding accuracies such as surface accuracy and eccentricity accuracy are important.

In the optical element production method II, after a preform having been preheated to a temperature at which the viscosity of the glass is $10^4$ dPa·s to 108 dPa·s is supplied to between a pair of upper and lower molds that face each other and each have a molding surface having been precisely worked, and the preform is subjected to pressure forming, thus the shape of the molding surface of the mold can be precisely transferred to the glass. The optical element production method II is a method recommended when improvement of productivity is important.

The pressure and time of the pressure forming can be determined as appropriate considering the viscosity of the glass and the like, for example, the press pressure may be approximately 5 MPa to 15 MPa and the press time may be 10 s to 300 s. The press conditions such as the press time and the press pressure may be appropriately set to known ranges depending on the shape and size of the molded product.

After that, the mold and the precision press-molded product are cooled, and the precision press-molded product is released preferably at a temperature equal to or lower than the strain point to take out the precision press-molded product. Note that in order to obtain optical characteristics of the exact desired values, the annealing conditions for the molded product during cooling, for example, the annealing rate and the like may be adjusted as appropriate.

It should be noted that optical elements according to this embodiment can be produced without the press molding step. For example, the optical elements can be obtained by casting homogeneous molten glass into a mold to form a glass block, performing annealing to remove strain and, meanwhile, adjusting the optical characteristics by setting the annealing conditions such that the refractive index of the glass is the desired value, then making glass pieces by cutting or cleaving the glass block, and further grinding and polishing the glass pieces to ultimately obtain the optical elements.

EXAMPLES

Optical glasses of the present disclosure will now be described in detail citing Examples and Comparative Examples; however, the present disclosure is not limited to the Examples.

As materials of the components; oxides, hydroxides, carbonates, nitrates, and the like corresponding to the components were prepared and vitrified, and the materials were then measured to weigh 100 g such that the compositions given in Tables 1 and 2 were obtained, followed by full mixing, thereby obtaining a glass batch. The glass batch was charged into a platinum crucible, and melted at 1000° C. to 1300° C. for 1 h to 2 h in an electric furnace. After that, stirring was timely performed to allow homogenization, followed by clarification, and the glass batch was then cast into a metal mold having been preheated to an appropriate temperature, and was then cooled slowly in the electric furnace to remove strain, thereby obtaining each of the optical glasses of Examples and Comparative Examples. For each optical glass, the characteristics were evaluated according to the procedure described below. The results are given in Tables 1 and 2.

<Devitrification Resistance Stability>

A glass block of each optical glass (glass block) was visually observed to see whether devitrification occurred or not. The devitrification resistance stability was evaluated according to the following criteria.

○: No devitrification observed

Δ: Devitrification observed only on glass surface x: Devitrification observed inside glass <Refractive Index (Nd) and Abbe Number (vd)>

The refractive index (nd) and the Abbe number (vd) of each optical glass was measured in accordance with JIS B 7071-1: 2018 "Measuring method for refractive index of optical glass—Part 1: Minimum deviation method" in the Japan Industrial Standards.

<Temperature Coefficient of Relative Refractive Index (0° C./20° C., Wavelength: 587.6 Nm)>

The temperature coefficient of the relative refractive index of the optical glass was measured in accordance with JIS B 7072-1: 2020 "Measuring method for temperature coefficient of refractive index of optical glass—Part 1: Minimum deviation method" in the Japan Industrial Standards. A smaller absolute value of this value indicates that changes in the optical characteristics depending on the temperature are small.

<Chemical Durability>

The chemical durability of the optical glass was measured based on JOGIS 07-2019 "Measuring Method for Chemical Durability of Optical Glass (Surface Method)" specified by the Japan Optical Glass Manufacturers' Association and evaluated to determine one of the Classes 1 to 5 which the chemical durability fell under. A smaller class value indicates better chemical durability.

<Specific Gravity (S·g)>

The specific gravity of the optical glass was measured based on JOGIS 05-2019 "Measuring Method for Specific Gravity of Optical Glass" specified by the Japan Optical Glass Manufacturers' Association. A smaller value of the specific gravity indicates better lightness.

<Glass Transition Temperature (Tg) and Yield Temperature (At)>

The glass transition temperature of the optical glass was measured based on JOGIS 08-2019 "Measuring Method for Thermal Expansion of Optical Glass" specified by the Japan Optical Glass Manufacturers' Association. In the above measurement, the temperature at which the elongation of the optical glass sample stopped and its contraction started was determined as the yield temperature (At). A smaller value of either the glass-transition temperature (Tg) or the yield temperature (At) indicates better low temperature formability.

TABLE 1

|  |  | Example 1 | Example 2 | Example 3 | Example 4 | Example 5 | Example 6 | Example 7 |
|---|---|---|---|---|---|---|---|---|
| $B_2O_3$ | mol % | 0.00 | 14.00 | 13.00 | 4.00 | 10.00 | 9.00 | 11.00 |
| $P_2O_5$ |  | 38.00 | 30.00 | 26.00 | 39.00 | 30.00 | 34.00 | 32.00 |
| $Al_2O_3$ |  | 8.00 | 5.00 | 8.00 | 5.00 | 0.00 | 9.00 | 6.00 |
| $Li_2O$ |  | 13.00 | 10.00 | 13.00 | 9.00 | 10.00 | 7.00 | 6.00 |
| $Na_2O$ |  | 13.00 | 9.00 | 11.00 | 9.00 | 5.00 | 12.00 | 8.00 |

TABLE 1-continued

| | | | | | | | | |
|---|---|---|---|---|---|---|---|---|
| K$_2$O | | 0.00 | 0.00 | 0.00 | 0.00 | 0.00 | 0.00 | 0.00 |
| MgO | | 14.00 | 17.00 | 15.00 | 25.00 | 25.00 | 18.00 | 17.00 |
| CaO | | 12.00 | 15.00 | 13.00 | 9.00 | 20.00 | 11.00 | 20.00 |
| SrO | | 0.00 | 0.00 | 0.00 | 0.00 | 0.00 | 0.00 | 0.00 |
| BaO | | 0.00 | 0.00 | 0.00 | 0.00 | 0.00 | 0.00 | 0.00 |
| ZnO | | 0.00 | 0.00 | 0.00 | 0.00 | 0.00 | 0.00 | 0.00 |
| ZrO$_2$ | | 0.00 | 0.00 | 0.00 | 0.00 | 0.00 | 0.00 | 0.00 |
| Y$_2$O$_3$ | | 0.00 | 0.00 | 0.00 | 0.00 | 0.00 | 0.00 | 0.00 |
| La$_2$O$_3$ | | 0.00 | 0.00 | 0.00 | 0.00 | 0.00 | 0.00 | 0.00 |
| Gd$_2$O$_3$ | | 2.00 | 0.00 | 1.00 | 0.00 | 0.00 | 0.00 | 0.00 |
| | | | | | | | | |
| Total | | 100.00 | 100.00 | 100.00 | 100.00 | 100.00 | 100.00 | 100.00 |
| B$_2$O$_3$ + P$_2$O$_5$ | mol % | 38.00 | 44.00 | 39.00 | 43.00 | 40.00 | 43.00 | 43.00 |
| MgO + CaO | mol % | 26.00 | 32.00 | 28.00 | 34.00 | 45.00 | 29.00 | 37.00 |
| Devitrification resistance stability | | ○ | ○ | Δ | ○ | ○ | ○ | ○ |
| Refractive index (nd) | | 1.55088 | 1.55668 | 1.56277 | 1.54559 | 1.56887 | 1.54485 | 1.55934 |
| Abbe number (vd) | | 66.0 | 68.0 | 66.5 | 68.4 | 68.0 | 68.2 | 67.9 |
| Temperature coefficient of relative refractive index [×10$^{-6\circ}$ C.$^{-1}$] | | -0.93 | 0.20 | 0.57 | −0.03 | −0.66 | 0.85 | 0.98 |
| Chemical durability (surface method) Class DW | | 2 | 1 | 1 | 2 | 1 | 2 | 2 |
| Specific gravity | | 2.84 | 2.74 | 2.80 | 2.67 | 2.78 | 2.69 | 2.74 |
| Tg [° C.] | | 428 | 478 | 483 | 433 | 488 | 466 | 498 |
| At [° C.] | | 462 | 518 | 511 | 462 | 523 | 498 | 534 |

| | | Example 8 | Example 9 | Example 10 | Example 11 | Example 12 | Example 13 | Example 14 |
|---|---|---|---|---|---|---|---|---|
| B$_2$O$_3$ | mol % | 13.00 | 7.00 | 5.00 | 10.00 | 5.00 | 5.00 | 8.00 |
| P$_2$O$_5$ | | 29.00 | 34.00 | 37.00 | 33.00 | 35.00 | 38.00 | 34.00 |
| Al$_2$O$_3$ | | 2.00 | 5.00 | 2.00 | 4.00 | 3.00 | 7.00 | 5.00 |
| Li$_2$O | | 14.00 | 13.00 | 7.00 | 13.00 | 9.00 | 8.00 | 13.00 |
| Na$_2$O | | 1.00 | 0.00 | 14.00 | 12.00 | 10.00 | 12.00 | 3.00 |
| K$_2$O | | 0.00 | 0.00 | 0.00 | 0.00 | 0.00 | 0.00 | 0.00 |
| MgO | | 18.00 | 21.00 | 20.00 | 0.00 | 34.00 | 30.00 | 3.00 |
| CaO | | 22.00 | 20.00 | 15.00 | 28.00 | 4.00 | 0.00 | 34.00 |
| SrO | | 0.00 | 0.00 | 0.00 | 0.00 | 0.00 | 0.00 | 0.00 |
| BaO | | 0.00 | 0.00 | 0.00 | 0.00 | 0.00 | 0.00 | 0.00 |
| ZnO | | 0.00 | 0.00 | 0.00 | 0.00 | 0.00 | 0.00 | 0.00 |
| ZrO$_2$ | | 0.00 | 0.00 | 0.00 | 0.00 | 0.00 | 0.00 | 0.00 |
| Y$_2$O$_3$ | | 0.00 | 0.00 | 0.00 | 0.00 | 0.00 | 0.00 | 0.00 |
| La$_2$O$_3$ | | 0.00 | 0.00 | 0.00 | 0.00 | 0.00 | 0.00 | 0.00 |
| Gd$_2$O$_3$ | | 1.00 | 0.00 | 0.00 | 0.00 | 0.00 | 0.00 | 0.00 |
| | | | | | | | | |
| Total | | 100.00 | 100.00 | 100.00 | 100.00 | 100.00 | 100.00 | 100.00 |
| B$_2$O$_3$ + P$_2$O$_5$ | mol % | 42.00 | 41.00 | 42.00 | 43.00 | 40.00 | 43.00 | 42.00 |
| MgO + CaO | mol % | 40.00 | 41.00 | 35.00 | 28.00 | 38.00 | 30.00 | 37.00 |
| Devitrification resistance stability | | Δ | ○ | ○ | ○ | ○ | ○ | ○ |
| Refractive index (nd) | | 1.57649 | 1.56538 | 1.55222 | 1.56599 | 1.54763 | 1.53460 | 1.57280 |
| Abbe number (vd) | | 66.9 | 67.5 | 68.7 | 68.1 | 68.4 | 68.6 | 67.1 |
| Temperature coefficient of relative refractive index [×10$^{-6\circ}$ C.$^{-1}$] | | 0.70 | 1.56 | −1.70 | −1.53 | −0.58 | 0.31 | 0.41 |
| Chemical durability (surface method) Class DW | | 2 | 2 | 1 | 1 | 1 | 2 | 2 |
| Specific gravity | | 2.84 | 2.69 | 2.75 | 2.80 | 2.70 | 2.64 | 2.74 |
| Tg [° C.] | | 493 | 464 | 455 | 492 | 427 | 420 | 496 |
| At [° C.] | | 521 | 497 | 493 | 521 | 469 | 454 | 531 |

| | | Example 15 | Example 16 | Example 17 | Example 18 | Example 19 | Example 20 |
|---|---|---|---|---|---|---|---|
| B$_2$O$_3$ | mol % | 6.00 | 8.00 | 5.00 | 3.00 | 12.00 | 10.00 |
| P$_2$O$_5$ | | 35.00 | 33.00 | 33.00 | 37.00 | 31.00 | 33.00 |
| Al$_2$O$_3$ | | 4.00 | 6.00 | 7.00 | 3.00 | 4.00 | 2.00 |
| Li$_2$O | | 11.00 | 11.00 | 11.00 | 12.00 | 8.00 | 12.00 |
| Na$_2$O | | 9.00 | 6.00 | 10.00 | 9.00 | 8.00 | 8.00 |
| K$_2$O | | 0.00 | 0.00 | 0.00 | 0.00 | 3.00 | 0.00 |
| MgO | | 23.00 | 20.00 | 22.00 | 26.00 | 21.00 | 24.00 |
| CaO | | 9.00 | 14.00 | 10.00 | 8.00 | 13.00 | 11.00 |
| SrO | | 0.00 | 0.00 | 0.00 | 0.00 | 0.00 | 0.00 |
| BaO | | 0.00 | 0.00 | 0.00 | 0.00 | 0.00 | 0.00 |
| ZnO | | 3.00 | 0.00 | 0.00 | 0.00 | 0.00 | 0.00 |
| ZrO$_2$ | | 0.00 | 2.00 | 0.00 | 0.00 | 0.00 | 0.00 |
| Y$_2$O$_3$ | | 0.00 | 0.00 | 2.00 | 0.00 | 0.00 | 0.00 |
| La$_2$O$_3$ | | 0.00 | 0.00 | 0.00 | 2.00 | 0.00 | 0.00 |
| Gd$_2$O$_3$ | | 0.00 | 0.00 | 0.00 | 0.00 | 0.00 | 0.00 |
| | | | | | | | |
| Total | | 100.00 | 100.00 | 100.00 | 100.00 | 100.00 | 100.00 |
| B$_2$O$_3$ + P$_2$O$_5$ | mol % | 41.00 | 41.00 | 38.00 | 40.00 | 43.00 | 43.00 |
| MgO + CaO | mol % | 32.00 | 34.00 | 32.00 | 34.00 | 34.00 | 35.00 |

TABLE 1-continued

| | | | | | | | |
|---|---|---|---|---|---|---|---|
| Devitrification resistance stability | | ○ | ○ | Δ | ○ | ○ | ○ |
| Refractive index (nd) | | 1.56407 | 1.56552 | 1.55739 | 1.55582 | 1.54923 | 1.55887 |
| Abbe number (vd) | | 66.2 | 66.0 | 66.1 | 66.7 | 67.9 | 68.5 |
| Temperature coefficient of relative refractive index [×10$^{-6°}$ C.$^{-1}$] | | 0.81 | 0.79 | 0.30 | −0.72 | −0.48 | −0.57 |
| Chemical durability (surface method) Class DW | | 1 | 1 | 1 | 2 | 1 | 1 |
| Specific gravity | | 2.84 | 2.85 | 2.85 | 2.85 | 2.77 | 2.72 |
| Tg [° C.] | | 461 | 460 | 446 | 428 | 485 | 446 |
| At [° C.] | | 497 | 504 | 490 | 459 | 519 | 485 |

TABLE 2

| | | Comparative Example 1 | Comparative Example 2 | Comparative Example 3 | Comparative Example 4 | Comparative Example 5 | Comparative Example 6 |
|---|---|---|---|---|---|---|---|
| B$_2$O$_3$ | mol % | 17.00 | 13.00 | 2.00 | 12.00 | 11.00 | 13.00 |
| P$_2$O$_5$ | | 24.00 | 23.00 | 42.00 | 29.00 | 32.00 | 26.00 |
| A$_{12}$O$_3$ | | 5.00 | 6.00 | 7.00 | 12.00 | 5.00 | 3.00 |
| Li$_2$O | | 10.00 | 9.00 | 12.00 | 9.00 | 3.00 | 17.00 |
| Na$_2$O | | 5.00 | 9.00 | 6.00 | 8.00 | 9.00 | 4.00 |
| K$_2$O | | 0.00 | 0.00 | 0.00 | 0.00 | 0.00 | 0.00 |
| MgO | | 23.00 | 20.00 | 17.00 | 20.00 | 20.00 | 18.00 |
| CaO | | 12.00 | 20.00 | 14.00 | 10.00 | 20.00 | 13.00 |
| SrO | | 0.00 | 0.00 | 0.00 | 0.00 | 0.00 | 0.00 |
| BaO | | 0.00 | 0.00 | 0.00 | 0.00 | 0.00 | 0.00 |
| ZnO | | 0.00 | 0.00 | 0.00 | 0.00 | 0.00 | 0.00 |
| ZrO$_2$ | | 0.00 | 0.00 | 0.00 | 0.00 | 0.00 | 0.00 |
| Y$_2$O$_3$ | | 0.00 | 0.00 | 0.00 | 0.00 | 0.00 | 0.00 |
| La$_2$O$_3$ | | 0.00 | 0.00 | 0.00 | 0.00 | 0.00 | 0.00 |
| Gd$_2$O$_3$ | | 1.00 | 0.00 | 0.00 | 0.00 | 0.00 | 1.00 |
| Total | | 100.00 | 100.00 | 100.00 | 100.00 | 100.00 | 100.00 |
| B$_2$O$_3$ + P$_2$O$_5$ | mol % | 41.00 | 36.00 | 44.00 | 41.00 | 43.00 | 39.00 |
| MgO + CaO | mol % | 35.00 | 40.00 | 31.00 | 30.00 | 40.00 | 36.00 |
| Devitrification resistance stability | | X | X | ○ | X | Δ | X |
| Refractive index (nd) | | 1.57103 | 1.57212 | 1.54292 | 1.54697 | 1.55731 | 1.57993 |
| Abbe number (vd) | | 66.7 | 67.0 | 68.2 | 67.2 | 67.9 | 66.7 |
| Temperature coefficient of relative refractive index [×10$^{-6°}$ C.$^{-1}$] | | 0.67 | 0.60 | 0.82 | 2.35 | 0.48 | 0.24 |
| Chemical durability (surface method) Class DW | | 1 | 1 | 3 | 2 | 2 | 1 |
| Specific gravity | | 2.84 | 2.79 | 2.64 | 2.66 | 2.76 | 2.82 |
| Tg [° C.] | | 504 | 520 | 422 | 475 | 508 | 476 |
| At [° C.] | | 535 | 554 | 445 | 508 | 552 | 508 |

| | | Comparative Example 7 | Comparative Example 8 | Comparative Example 9 | Comparative Example 10 | Comparative Example 11 | Comparative Example 12 |
|---|---|---|---|---|---|---|---|
| B$_2$O$_3$ | mol % | 4.00 | 10.00 | 8.00 | 10.00 | 10.00 | 9.00 |
| P$_2$O$_5$ | | 37.00 | 28.00 | 29.00 | 30.00 | 23.00 | 33.00 |
| A$_{12}$O$_3$ | | 1.00 | 3.00 | 5.00 | 5.00 | 7.00 | 5.00 |
| Li$_2$O | | 7.00 | 8.00 | 9.00 | 11.00 | 10.00 | 8.00 |
| Na$_2$O | | 17.00 | 8.00 | 5.00 | 8.00 | 12.00 | 3.00 |
| K$_2$O | | 0.00 | 0.00 | 0.00 | 0.00 | 0.00 | 0.00 |
| MgO | | 19.00 | 37.00 | 7.00 | 20.00 | 18.00 | 21.00 |
| CaO | | 15.00 | 6.00 | 37.00 | 11.00 | 20.00 | 10.00 |
| SrO | | 0.00 | 0.00 | 0.00 | 0.00 | 0.00 | 0.00 |
| BaO | | 0.00 | 0.00 | 0.00 | 0.00 | 0.00 | 0.00 |
| ZnO | | 0.00 | 0.00 | 0.00 | 0.00 | 0.00 | 0.00 |
| ZrO$_2$ | | 0.00 | 0.00 | 0.00 | 0.00 | 0.00 | 0.00 |
| Y$_2$O$_3$ | | 0.00 | 0.00 | 0.00 | 0.00 | 0.00 | 0.00 |
| La$_2$O$_3$ | | 0.00 | 0.00 | 0.00 | 0.00 | 0.00 | 0.00 |
| Gd$_2$O$_3$ | | 0.00 | 0.00 | 0.00 | 5.00 | 0.00 | 1.00 |
| Total | | 100.00 | 100.00 | 100.00 | 100.00 | 100.00 | 100.00 |
| B$_2$O$_3$ + P$_2$O$_5$ | mol % | 41.00 | 38.00 | 37.00 | 40.00 | 33.00 | 47.00 |
| MgO + CaO | mol % | 34.00 | 43.00 | 44.00 | 31.00 | 38.00 | 31.00 |
| Devitrification resistance stability | | ○ | X | X | X | X | ○ |
| Refractive index (nd) | | 1.55028 | 1.55562 | 1.57949 | 1.58124 | 1.56780 | 1.54890 |
| Abbe number (vd) | | 68.6 | 68.0 | 66.4 | 63.6 | 66.4 | 68.0 |
| Temperature coefficient of relative refractive index [×10$^{-6°}$ C.$^{-1}$] | | −2.66 | 0.33 | 0.31 | 0.26 | −0.18 | 0.48 |
| Chemical durability (surface method) Class DW | | 1 | 1 | 1 | 1 | 1 | 3 |

TABLE 2-continued

| | | | | | | | |
|---|---|---|---|---|---|---|---|
| Specific gravity | | | 2.79 | 2.74 | 2.83 | 3.12 | 2.81 | 2.76 |
| Tg [° C.] | | | 454 | 471 | 533 | 477 | 502 | 455 |
| At [° C.] | | | 488 | 500 | 567 | 523 | 543 | 484 |

| | | | Comparative Example 13 | Comparative Example 14 | Comparative Example 15 | Comparative Example 16 | Comparative Example 17 |
|---|---|---|---|---|---|---|---|
| $B_2O_3$ | mol % | | 10.00 | 8.00 | 10.00 | 15.00 | 7.00 |
| $P_2O_5$ | | | 34.00 | 29.00 | 27.00 | 30.00 | 38.00 |
| $Al_2O_3$ | | | 9.00 | 3.00 | 2.00 | 2.50 | 2.50 |
| $Li_2O$ | | | 14.00 | 10.00 | 10.50 | 10.00 | 17.00 |
| $Na_2O$ | | | 14.00 | 10.00 | 10.50 | 0.00 | 0.00 |
| $K_2O$ | | | 0.00 | 0.00 | 0.00 | 0.00 | 0.00 |
| MgO | | | 10.00 | 13.00 | 13.00 | 12.50 | 6.00 |
| CaO | | | 8.00 | 25.00 | 24.00 | 12.50 | 1.50 |
| SrO | | | 0.00 | 3.00 | 0.00 | 7.50 | 7.00 |
| BaO | | | 0.00 | 0.00 | 3.00 | 10.00 | 20.00 |
| ZnO | | | 0.00 | 0.00 | 0.00 | 0.00 | 0.00 |
| $ZrO_2$ | | | 0.00 | 0.00 | 0.00 | 0.00 | 0.00 |
| $Y_2O_3$ | | | 0.00 | 0.00 | 0.00 | 0.00 | 0.00 |
| $La_2O_3$ | | | 0.00 | 0.00 | 0.00 | 0.00 | 0.00 |
| $Gd_2O_3$ | | | 1.00 | 1.00 | 0.00 | 0.00 | 1.00 |
| Total | | | 100.00 | 100.00 | 100.00 | 100.00 | 100.00 |
| $B_2O_3 + P_2O_5$ | mol % | | 44.00 | 37.00 | 37.00 | 45.00 | 45.00 |
| MgO + CaO | mol % | | 18.00 | 36.00 | 37.00 | 25.00 | 7.50 |
| Devitrification resistance stability | | | ○ | Δ | Δ | ○ | ○ |
| Refractive index (nd) | | | 1.54665 | 1.58118 | 1.57764 | 1.59068 | 1.59130 |
| Abbe number (vd) | | | 67.5 | 66.4 | 67.1 | 67.0 | 66.1 |
| Temperature coefficient of relative refractive index [$\times 10^{-6\circ}$ C.$^{-1}$] | | | −0.22 | −1.18 | −1.86 | −0.09 | −2.39 |
| Chemical durability (surface method) Class DW | | | 3 | 1 | 1 | 1 | 3 |
| Specific gravity | | | 2.75 | 2.95 | 2.93 | 3.11 | 3.36 |
| Tg [° C.] | | | 431 | 485 | 486 | 498 | 458 |
| At [° C.] | | | 465 | 529 | 527 | 540 | 492 |

Table 1 demonstrates that each of the optical glasses of Examples had low dispersibility since the optical glass had an Abbe number (vd) of 60 or more. Further, each of the optical glasses of Examples was found to have sufficient lightness since its specific gravity was 2.90 or less. Each of the optical glasses of Examples was found to have small changes in the optical characteristics depending on the temperature since the absolute value of the temperature coefficient of the relative refractive index was $2.0 \times 10^{-6\circ}$ C.$^{-1}$ or less. Each of the optical glasses of Examples was found to be excellent in chemical durability since the class of chemical durability was Class 1 or 2. Further, each of the optical glasses of Examples was found to be excellent in low temperature formability since the glass transition temperature (Tg) was 500° C. or less and the yield temperature (At) was 540° C. or less.

By contrast, as seen in Table 2, the optical glass of Comparative Example 1 had low devitrification resistance stability. This may be because the content of $B_2O_3$ was excessively high.

The optical glass of Comparative Example 2 had low devitrification resistance stability, and the glass transition temperature (Tg) and the yield temperature (At) of the optical glass were high. This may be because the content of $P_2O_5$ was excessively low.

The optical glass of Comparative Example 3 had low chemical durability falling under Class 3 of the classes of chemical durability. This may be because the content of $P_2O_5$ was excessively high.

The optical glass of Comparative Example 4 had low devitrification resistance stability, and the absolute value of the temperature coefficient of the relative refractive index of the optical glass was large. This may be because the content of $Al_2O_3$ was excessively high.

The optical glass of Comparative Example 5 had a high glass transition temperature (Tg) and a high yield temperature (At). This may be because the content of $Li_2O$ was excessively low.

Further, the optical glass of Comparative Example 6 had low devitrification resistance stability. This may be because the content of $Li_2O$ was excessively high.

The absolute value of the temperature coefficient of the relative refractive index of the optical glass of Comparative Example 7 was large. This may be because the content of $Na_2O$ was excessively high.

The optical glass of Comparative Example 8 had low devitrification resistance stability. This may be because the content of MgO was excessively high.

The optical glass of Comparative Example 9 had low devitrification resistance stability, and the glass transition temperature (Tg) and the yield temperature (At) of the optical glass were high. This may be because the content of CaO was excessively high.

The optical glass of Comparative Example 10 had low devitrification resistance stability and a high specific gravity. This may be because the content of $Gd_2O_3$ was excessively high.

The optical glass of Comparative Example 11 had low devitrification resistance stability, and the glass transition temperature (Tg) and the yield temperature (At) of the optical glass were high. This may be because the total content of $B_2O_3$ and $P_2O_5$ was excessively low.

The optical glass of Comparative Example 12 had low chemical durability falling under Class 3 of the classes of chemical durability. This may be because the total content of $B_2O_3$ and $P_2O_5$ was excessively high.

The optical glass of Comparative Example 13 had low chemical durability falling under Class 3 of the classes of chemical durability. This may be because the total content of MgO and CaO was excessively low.

The optical glass of Comparative Example 14 had a high specific gravity. This may be because SrO was contained.

Further, the optical glass of Comparative Example 15 had a high specific gravity. This may be because BaO was contained.

The optical glass of Comparative Example 16 had a high specific gravity. This may be because SrO and BaO were contained.

Further, the optical glass of Comparative Example 17 had low chemical durability falling under Class 3 of chemical durability, and the absolute value of the temperature coefficient of the relative refractive index of the optical glass was high, and also the specific gravity thereof was large. This may be because the total content of MgO and CaO was low, and SrO and BaO were contained.

INDUSTRIAL APPLICABILITY

The present disclosure provides a low dispersion optical glass that is lightweight, has small changes in optical characteristics depending on the temperature, and is excellent in chemical durability and low temperature formability. Further, the present disclosure also provides a preform for precision press molding and an optical element each using the above optical glass.

The invention claimed is:

1. An optical glass comprising a composition consisting only of, by mol %:
   0% or more and 15% or less $B_2O_3$;
   25% or more and 40% or less $P_2O_5$, the total content of $B_2O_3$ and $P_2O_5$ being 35% or more and 45% or less;
   0% or more and 10% or less $Al_2O_3$;
   5% or more and 15% or less $Li_2O$;
   0% or more and 15% or less $Na_2O$;
   0% or more and 5% or less $K_2O$;
   0% or more and 35% or less MgO;
   0% or more and 35% or less CaO, the total content of MgO and CaO being 20% or more;
   0% or more and 5% or less ZnO;
   0% or more and 3% or less $ZrO_2$;
   0% or more and 3% or less $Y_2O_3$;
   0% or more and 3% or less $La_2O_3$; and
   0% or more and 3% or less $Gd_2O_3$,
   wherein the composition does not contain SrO and BaO, and
   the optical glass has an Abbe number (vd) of 62 or more and 70 or less.

2. The optical glass according to claim 1, wherein the optical glass has a refractive index (nd) of 1.50 or more and 1.60 or less.

3. An optical element comprising, as a material, the optical glass according to claim 1.

4. The optical glass according to claim 2, wherein the optical glass has a specific gravity of 2.90 or less.

5. The optical glass according to claim 2, wherein an absolute value of a temperature coefficient of a relative refractive index of the optical glass for a wavelength of 587.6 nm with respect to 0° C. and 20° C. is $2.0 \times 10^{-6}$ C.$^{-1}$ or less.

6. The optical glass according to claim 2, wherein a class of DW of chemical durability measured by a surface method based on JOGIS 07-2019 is either Class 1 or 2.

7. The optical glass according to claim 2, wherein the optical glass has a glass-transition temperature Tg of 500° C. or less and a yield temperature At of 540° C. or less.

8. A preform for precision press molding, comprising, as a material, the optical glass according to claim 2.

9. An optical element comprising, as a material, the optical glass according to claim 2.

10. The optical glass according to claim 1, wherein the optical glass has a specific gravity of 2.90 or less.

11. The optical glass according to claim 10, wherein an absolute value of a temperature coefficient of a relative refractive index of the optical glass for a wavelength of 587.6 nm with respect to 0° C. and 20° C. is $2.0 \times 10^{-6}$ C.$^{-1}$ or less.

12. The optical glass according to claim 10, wherein a class of DW of chemical durability measured by a surface method based on JOGIS 07-2019 is either Class 1 or 2.

13. The optical glass according to claim 10, wherein the optical glass has a glass-transition temperature Tg of 500° C. or less and a yield temperature At of 540° C. or less.

14. A preform for precision press molding, comprising, as a material, the optical glass according to claim 10.

15. An optical element comprising, as a material, the optical glass according to claim 10.

16. The optical glass according to claim 1, wherein an absolute value of a temperature coefficient of a relative refractive index of the optical glass for a wavelength of 587.6 nm with respect to 0° C. and 20° C. is $2.0 \times 10^{-6}$ C.$^{-1}$ or less.

17. The optical glass according to claim 16, wherein a class of DW of chemical durability measured by a surface method based on JOGIS 07-2019 is either Class 1 or 2.

18. The optical glass according to claim 1, wherein a class of DW of chemical durability measured by a surface method based on JOGIS 07-2019 is either Class 1 or 2.

19. The optical glass according to claim 1, wherein the optical glass has a glass-transition temperature Tg of 500° C. or less and a yield temperature At of 540° C. or less.

20. A preform for precision press molding, comprising, as a material, the optical glass according to claim 1.

* * * * *